(12) United States Patent
Mascarenhas et al.

(10) Patent No.: US 8,237,130 B1
(45) Date of Patent: Aug. 7, 2012

(54) NEUTRON SCATTER CAMERA FOR IMPROVED NEUTRON DETECTION

(75) Inventors: Nicholas C Mascarenhas, Livermore, CA (US); James S. Brennan, Rodeo, CA (US); Charles H. Greenberg, San Francisco, CA (US)

(73) Assignee: Sandia Corporation, Albuquerque, NM (US)

( * ) Notice: Subject to any disclaimer, the term of this patent is extended or adjusted under 35 U.S.C. 154(b) by 361 days.

(21) Appl. No.: 12/701,669

(22) Filed: Feb. 8, 2010

Related U.S. Application Data

(63) Continuation-in-part of application No. 12/237,251, filed on Sep. 24, 2008, now Pat. No. 7,741,613.

(51) Int. Cl.
    *G01T 3/06* (2006.01)
(52) U.S. Cl. .................................. 250/390.11
(58) Field of Classification Search .............. 250/390.11
    See application file for complete search history.

(56) References Cited

U.S. PATENT DOCUMENTS 7,741,613 B1 * 6/2010 Mascarenhas et al. .. 250/390.11

OTHER PUBLICATIONS

N. Mascarenhas, J. Brennan, K. Krenz, P. Marleau, S. Mrowka, "Results With the Neutron Scatter Camera." IEEE Transactions on Nuclear Science, vol. 56 Issue 3 (Jun. 2009) pp. 1269-1273. <doi: 10.1109/TNS.2009.2016659> downloaded Mar. 27, 2012.*
J. Brennan, R. Cooper, M. Gerling, P. Marleau, N. Mascarenhas, S. Mrowka, "Results with a 32-Element Dual Mode Imager." 2010 IEEE Nuclear Science Symposium Conference Record (NSS/MIC), Knoxville TN, (Oct. 30-Nov. 6, 2010) pp. 1634-1639. <doi: 10.1109/NSSMIC.2010.5874053> dated Jun. 13, 2011 downloaded Mar. 27, 2012.*

* cited by examiner

*Primary Examiner* — Constantine Hannaher
(74) *Attorney, Agent, or Firm* — Timothy P. Evans

(57) ABSTRACT

An instrument that will directly image the fast fission neutrons from a special nuclear material source wherein the neutron detection efficiency is increased has been described. Instead of the previous technique that uses a time-of-flight (TOF) between 2 widely spaced fixed planes of detectors to measure scatter neutron kinetic energy, we now use the recoil proton energy deposited in the second of the 2 scatter planes which can now be repositioned much closer together. Allowing the 2 planes to be placed closer together has been shown to provide up to about a ~170% improvement in detection efficiency without adding additional detectors and ancillary electronics. The distance between planes also may be dynamically changed using a suitable common technique such as a gear- or motor-drive to toggle between the various positions. The angular resolution of this new configuration is diminished but this loss of resolution may be acceptable for those applications where only modest directionality is sufficient to identify a threat.

13 Claims, 16 Drawing Sheets

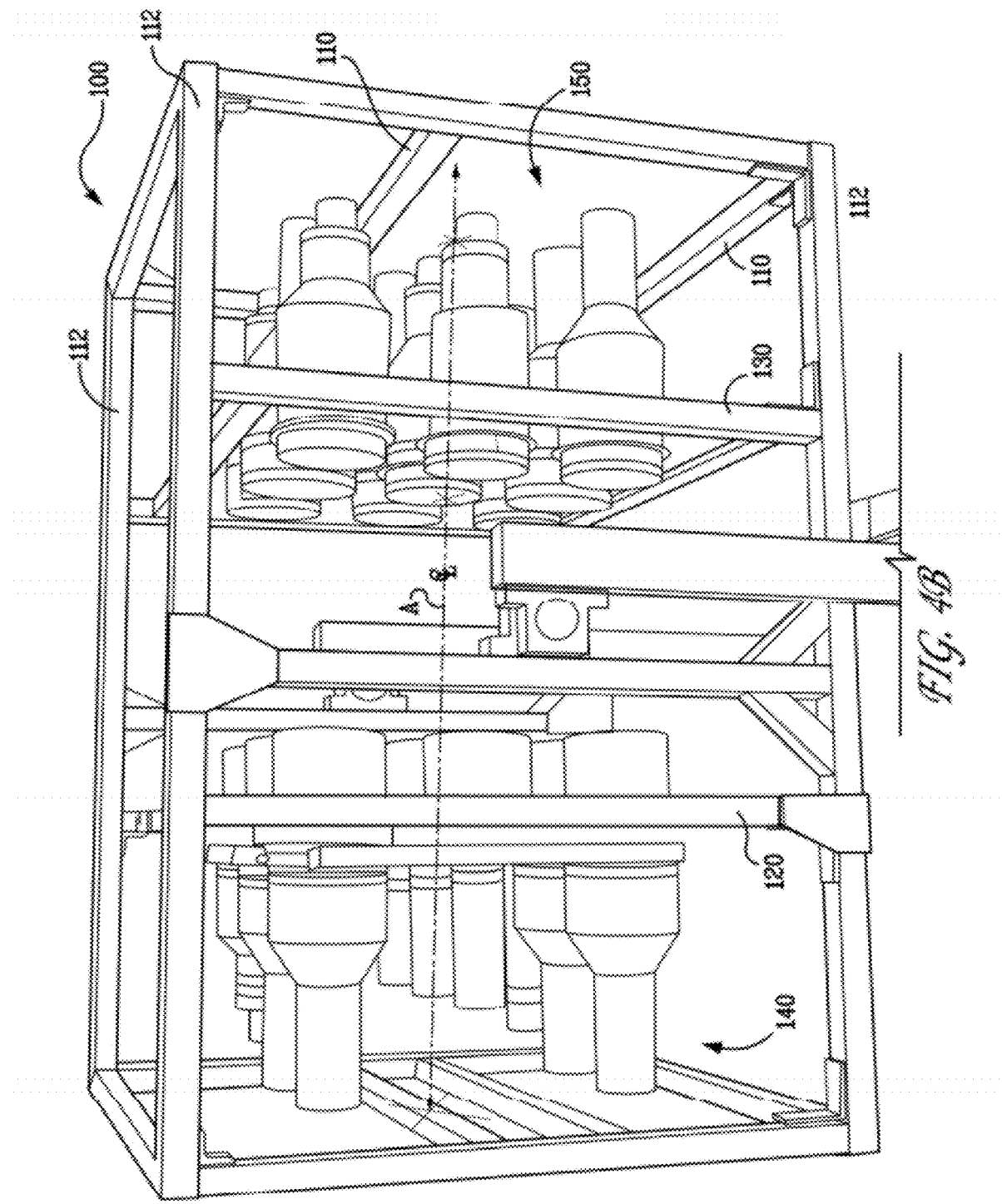

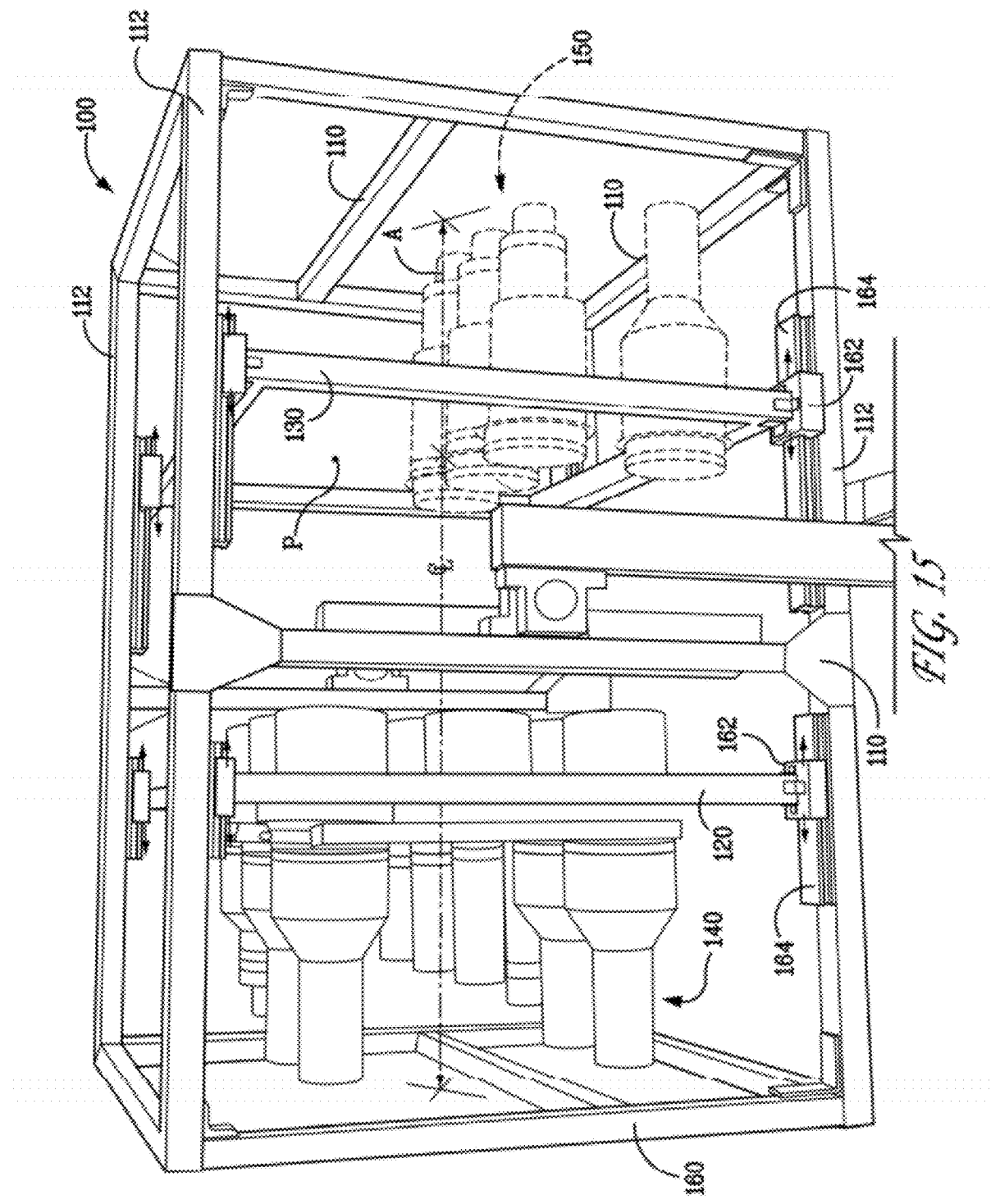

NEUTRON SCATTER CAMERA FOR IMPROVED NEUTRON DETECTION

CROSS REFERENCE TO RELATED APPLICATIONS

This application is a continuation-in-part of U.S. patent application Ser. No. 12/237,251 originally filed Sep. 24, 2008 now U.S. Pat. No. 7,741,613 and entitled "Neutron Scatter Camera" from which benefit is hereby claimed.

STATEMENT OF GOVERNMENT SUPPORT

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

BACKGROUND

Technical Field

The present invention generally describes a passive "camera" system for visualizing the presence and location of a source of neutron radiation. More particularly, this invention describes a device for detecting small amounts of fissile material and certain nuclear material such as plutonium or highly enriched weapons-grade uranium (HEU), also known as "special nuclear materials," or SNM, which might be concealed within bulk cargo containers, railroad rail cars, boats and ocean vessels, planes, and highway vehicles as smuggled contraband.

SNM emit detectable amounts of high energy particles during active and passive interrogation. This radiation can be imaged and thus allow visualization of shielded and/or smuggled radioactive materials. Although gamma-ray imaging is appropriate for many cases, neutrons are much more penetrating through high-Z shielding/concealment materials, and are thus preferred in certain scenarios (e.g. weapons grade plutonium or HEU smuggled inside a lead pig several inches thick).

Particle scatter cameras use conservation of energy and momentum for the collision between an incident neutron ($n_o$) and a proton (p) from the detector to calculate the direction of origin for the neutron. This is shown schematically in FIG. 1. The incident neutron scatters in the first detector and then again in the second detector. The angle of the first scatter ($\theta_1$) is related to the energy given to the proton in the first scatter, $E_p$, and the energy of the scattered neutron, $E_{n_1}$, as $$\tan^2\theta_1 = \frac{E_p}{E_{n_1}}. \tag{1}$$

The proton recoil energy is measured directly from the detector output and the energy of the recoiling neutron is determined from the time-of-flight (TOF) between the two detectors as shown in equation 2.

$$E_{n_1} = \frac{m}{2}\left(\frac{d}{TOF}\right)^2, \tag{2}$$

where d is the separation distance between the two detectors.

Because the direction of the recoiling proton is not measured, only the ring defined by the initial scatter angle $\theta_1$ is determined. This defines a probability cone which can be back projected onto a virtual image plane. An image is formed by overlapping these cones over many events. In addition, the energy of the incident neutron ($E_{n_o}$) is obtained as the sum of the two measured energies $E_p$ and $E_{n_1}$, i.e., $$E_{n_o} = E_p + E_{n_1}, \tag{3}$$

and thereby providing an accurate neutron spectrometer and allows differentiation of different types of neutron sources.

Such instruments are very similar to Compton cameras used for gamma-ray detection such as those developed by J. Ryan et al. ("COMPTEL measurements of solar flare neutrons," *Advances in Space Research*, 1993, v. 13(9): p. 255-258). This device was developed for astrophysics where it was shown to provide an approximately 10-fold increase in sensitivity for the detection of solar neutrons over traditional neutron counting techniques. However, until recently the lowest energies of interest have been for incident neutrons above about 10 MeV. At these higher energies additional information can be obtained and it is easier to determine interaction parameters. For instance, fast neutron imagers have been developed by tracking the recoil protons in scintillating fibers as shown by R. S. Miller et al. ("SONTRAC: An imaging spectrometer for MeV neutrons," *Nuclear Instruments and Methods* A, 2003, v. 505: p. 36) and Justin Peel, et al., ("Development of a Directional Scintillating Fiber Detector for 14 MeV Neutrons," *Nuclear Instruments and Methods* A, 2006, v. 556: p. 287). Although these approaches have been successful at D-T and higher energies, they are difficult to apply to SNM neutron energies (~1 MeV) due to the limited range of the proton recoil.

SUMMARY

Therefore, what is needed is a device capable of detecting fission neutrons and to provide an image of the source of the fission neutrons and its location in space.

We present results from a prototype neutron scatter camera, and discuss key parameters that determine the detector's performance.

Both the foregoing general description and the following detailed description are exemplary and explanatory only and are intended to provide further explanation of the invention as claimed. The accompanying drawings are included to provide a further understanding of the invention and illustrate several embodiments of the invention, and together with the description serve to explain the principles of the invention.

BRIEF DESCRIPTION OF THE DRAWINGS

The accompanying drawings illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4B shows a close-up view of the 9×9 cell detector assembly neutron camera of the present embodiment.

FIG. 15 shows a schematic cartoon of an improved neutron camera used in the present embodiment having two groups of movable scintillation detectors.

DETAILED DESCRIPTION OF THE EMBODIMENTS

Techniques for imaging thermal neutrons have already been developed. However, these approaches only image the moderating material, not the true SNM source. Traditional neutron detectors such as $^3$He tubes and scintillators simply count neutrons. We have developed an instrument that will directly image the fast fission neutrons from an SNM source using a neutron scatter camera. In addition to being a neutron imager, this instrument is also a neutron spectrometer, and can differentiate between different types of neutron sources (e.g. fission, gamma-n, cosmic ray, and d-d or d-t fusion). Moreover, our instrument will be able to pinpoint the source location. We will present results from a prototype detector and discuss key parameters that determine detector performance.

High energy neutrons are a key indicator of the presence of SNM. Using a carefully designed neutron detector, plutonium can be found passively and HEU can be found using active interrogation. As with all forms of radiation detection, the discrimination of background radiation is an issue. In active systems radiation is introduced into the object under scrutiny and ambient fields are generally high. Under such conditions the background is often not known a priori and the signal-to-noise ratio remains constant regardless of the size of the detector and length of the measurement. Both the signal and background rates scale linearly with the cross-sectional area of the detector. However, imaging can be used to increase sensitivity by rejecting radiation from directions other than those of interest. For a compact source, the background can be reduced by the square of the ratio of the size of a pixel to the field-of-view (FOV) of the detector, while the signal remains constant. Thus, imaging increases the signal-to-noise by the inverse of the angular resolution of the detector. In addition it can be used to apply a spatial size filter, allowing one to select compact objects, which are of concern, over distributed objects that generally are not.

Although gamma-rays are one option for imaging, neutrons have the advantage of better penetration through high-z shielding, and are thus preferred in many cases. To realize these advantages one must image unscattered fission neutrons which means that the chosen imaging system must be sensitive to fission neutrons. This can be accomplished using a neutron scatter camera.

A Neutron Scatter Camera

Figure 1:
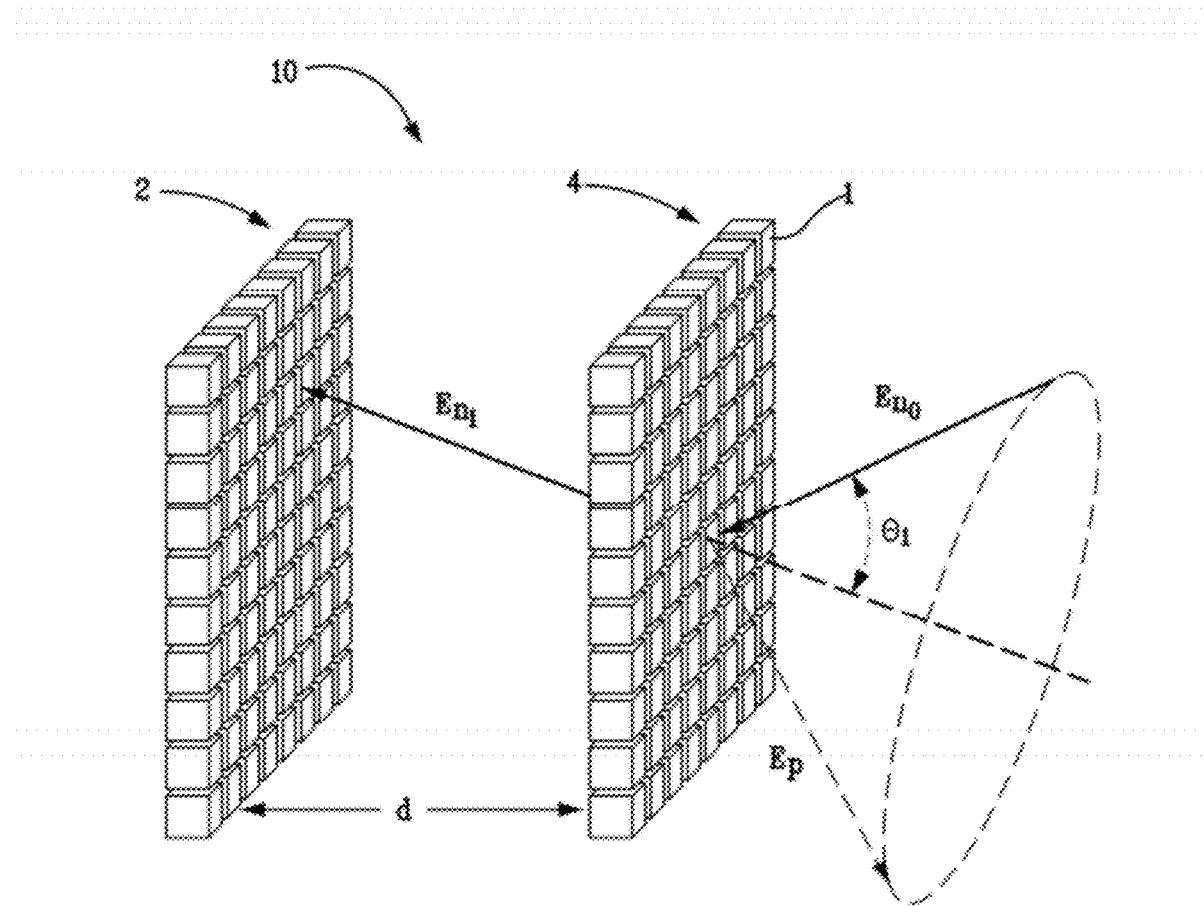
FIG. 1 shows a schematic and principle of operation of a generalized neutron camera.
Figure 2:
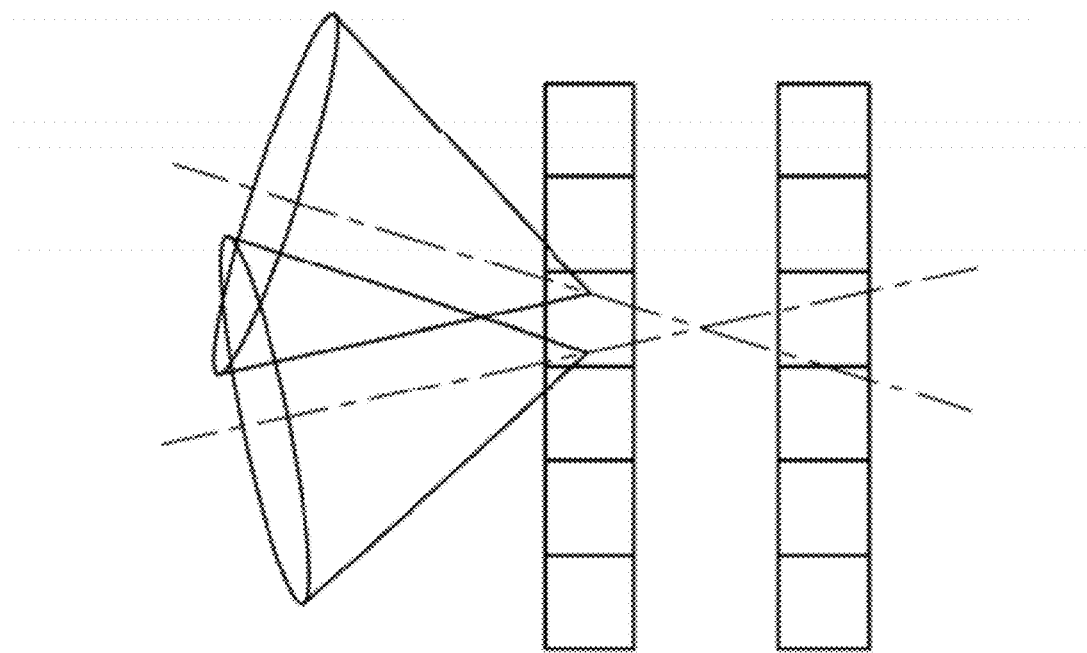
FIG. 2 shows the error in ring directions based on finite position resolution (pixel size) of the detector in the generalized neutron camera.
Figure 3:
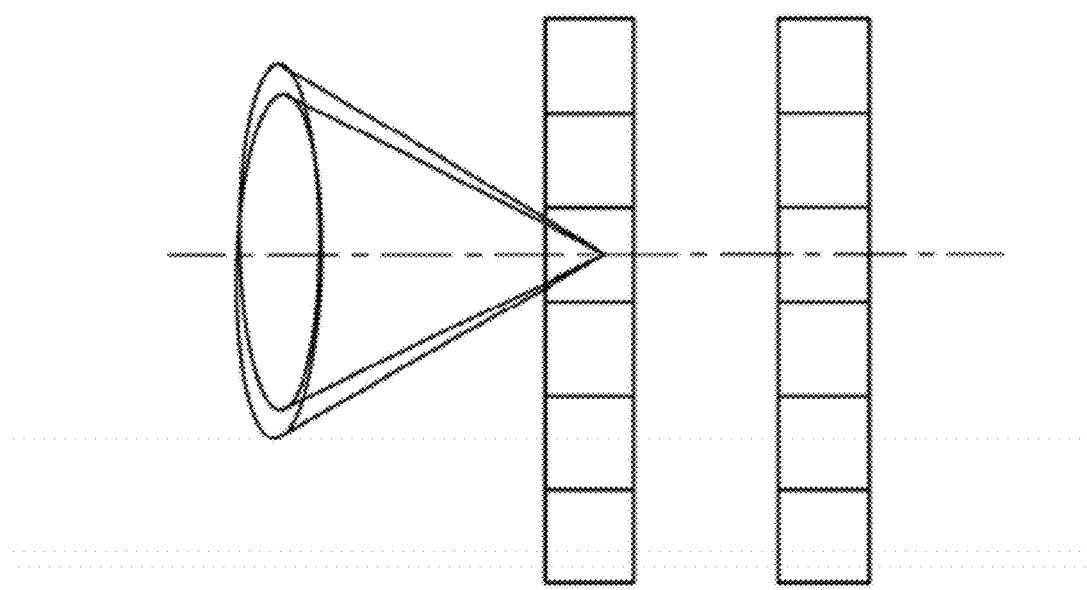
FIG. 3 shows the error due to uncertainties in energy measurements in the generalized neutron camera.

A generalized embodiment of the neutron camera 10 of the present invention is shown in FIG. 1. The performance of this and other "scatter" cameras is typically given in terms of its angular resolution measurement. This is the width of the overlapping rings, shown in FIG. 2, calculated from the measured data. There are two basic contributors to this width. The first is due to the position resolution (pixel size) of the generalized camera of FIG. 1. The pixel size limits the accuracy with which one can draw a line between the two scatter sites, thereby generating uncertainty in the direction of the cone axis of the scatter event and thus the center of the associated ring. Moreover, and as can be seen by combining equations 1 and 2, uncertainties in the energies of the two measured quantities lead to an uncertainty in the scatter angle itself. This provides a "thickness" to the probability cone as shown in FIG. 3.

Because the energy of the scattered neutron $E_{n_1}$ is determined by its TOF, the resolution of this measurement is ultimately determined by the separation distance (d) between the two groups of detectors 2 and 4 shown in FIG. 1 as well as the size of the individual detector 1, or "pixel." For a distance of about 0.4 meter, or about 16 inches, a front pixel diameter of 5 inches, a rear pixel diameter of 5 inches, and a timing resolution of 1 ns, there is an approximately 2 to 3 ns error in our TOF measurement for a 2 MeV neutron taking about 20 ns to travel between the two detector groups. This imputes an approximate 20% error in $E_{n_1}$. Because it takes ~1.5 ns for a gamma-ray to traverse the same distance, this timing measurement can also be used for gamma/neutron separation.

Our current camera comprises nine 5" dia.×5" thick EJ301 or EJ309 liquid scintillator cells (scintillator obtained from ELJEN Technology, Sweetwater, Tex.) in a front "grouping" and nine 5" dia.×5" thick EJ301 or EJ309 liquid scintillator cells in a rear grouping. Both groupings are comprised of uniform, regular arrays but need not be so disposed. The front scintillator cells were made to be 2 inches thick to promote a high neutron scatter efficiency while also providing that scattered neutrons escape the cell without further interaction to interact with one of the rear scintillation cells. If the front cells are too thick, a second scatter within these cells becomes probable which would in turn corrupt the energy measurement and making it impossible to reconstruct the neutron's incident direction. The rear cells may be thicker to increase efficiency but increasing the thickness of the rear cells also adds to the uncertainty in the location of the scattering site which worsens the uncertainty in the TOF measurement.

Each scintillation cell was instrumented at one end with a "fast" (1.3 ns resolution) HAMAMATSU H6527, 5" dia. photomultiplier tube (PMT) to form individual detector assemblies to provide a means for "reading-out" the signal generated by the cell. Each of the detector assemblies, therefore, comprises a scintillator cell having an unobstructed "outward" looking face and an "inward" looking face "capped" by the PMT.

These detector assemblies were then grouped together and individually mounted onto a set of rigid struts fixed to one of two separate structural frame members. Moreover, the detectors associated with each frame were further disposed about a virtual center axis normal to each frame and the "outward" looking faces of each detector were mounted in the same direction although this need not be the case.

The "camera" structure was prepared by mounting these two groups of detector assemblies (also referred to as "cells" or "elements") together within a three-dimensional cage, thereby holding the detector assemblies relative to each other as a rigid structure. The two frames were mounted at equal distances from a virtual center plane running through the cage such that the two frame members were spaced apart at a fixed distance optimized for the greatest (angular) coverage of the second group of detectors to neutrons scattered out of the first group while also minimizing the error in the TOF measurement of the neutrons scattered between the two groups of detectors. That is, the distance between the detector groups is determined by balancing the overall sensitivity of the detector with its timing resolution. The closer together the two groups of detectors are positioned, the greater the sensitivity because the rear detector group covers more of the angular space of neutrons scattering out of the front detector group. However, the error in the TOF measurement increases because the uncertainty caused by the depth of the cells with respect to the distance between scatters increases: if the two groups of detectors are too close, the error in the depth of the cell dominates the timing resolution.

Figure 4A:
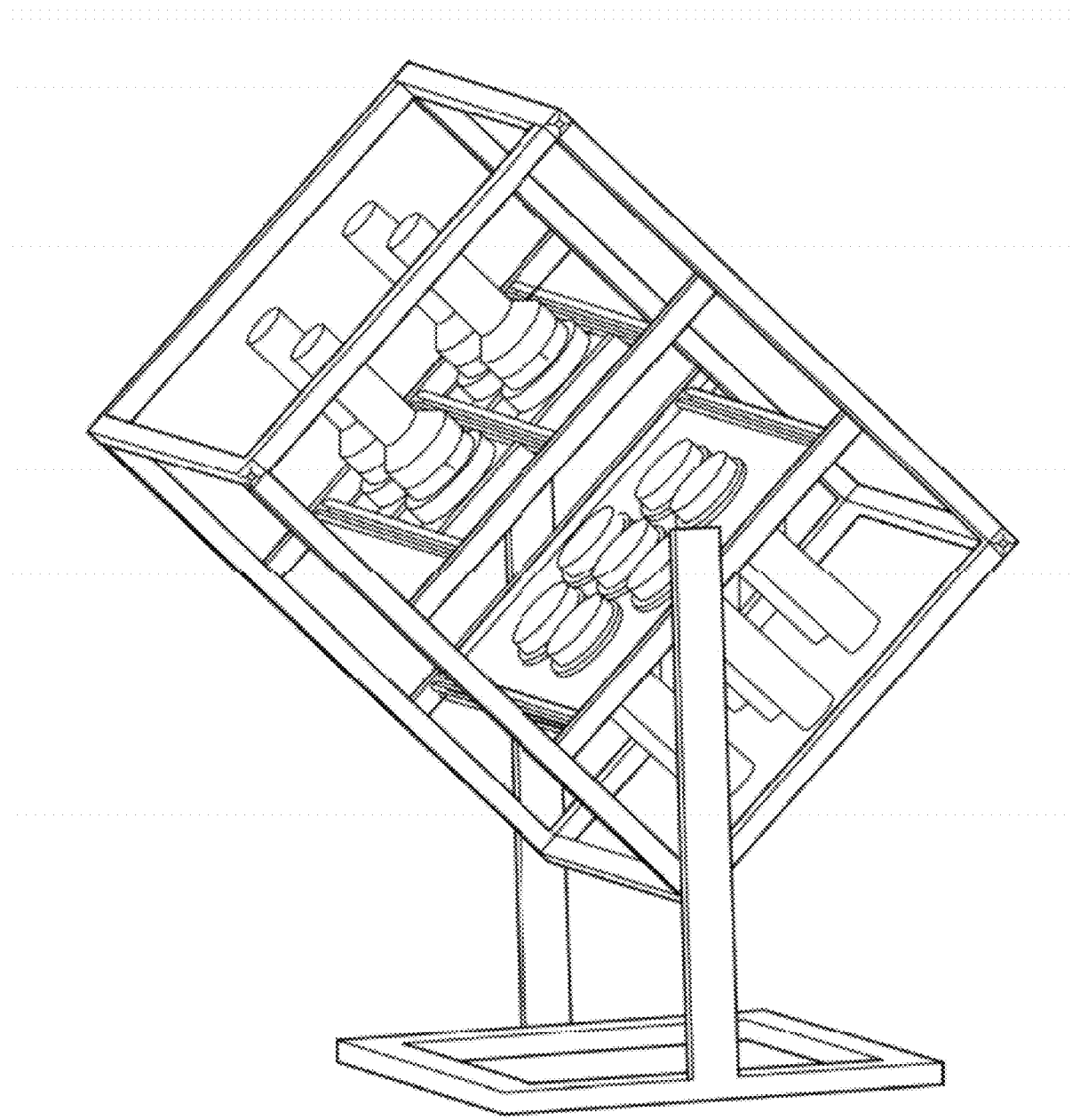
FIG. 4A shows a cartoon of a 7×4 cell detector assembly neutron camera contained within the camera cage structure and illustrates how the camera is deployed.

A pivot assembly is also provided for the camera structure and is attached to opposite sides of the cage at midpoints of two of the faces of the cage wherein the pivot arms are designed to be greater than half the length of the cage thereby allowing pointing the device through $2\pi$ radians. A cartoon of one of the earlier 7×4 element prototype detector assemblies is shown in FIG. 4A. The assembled camera of the present embodiment is shown in FIG. 4B.

Finally, we employed VME multichannel analog-to-digital converters (ADC), constant fraction discriminators (CFD), and high voltage power supplies each obtained from CAEN SpA. (Viareggio, Italy) to allow for a scalable system. A custom data acquisition (DAQ) readout using LABVIEW® software available from National Instruments Corp. (Austin, Tex.) was also developed. Detector sensitivity can be gained simply by increasing the number of elements.

Detector performance was enhanced by means of an improvement in background rejection. We have found that gamma-rays that "Compton scatter" off of electrons in the detector elements satisfy the coincidence trigger. If the same gamma-ray is detected in both arrays of the instrument, it can be rejected by its TOF. However, we have found that discriminating neutrons from Compton gamma-rays by the TOF between arrays alone is not sufficient. When the gamma-ray background is large or with large detector volumes (e.g., when the proto-type camera is scaled up in size), two gamma-rays can scatter in different elements producing an accidental coincidence with a TOF consistent with a neutron scattering event. This "false" neutron event rate can often be a higher background than the actual neutron background, especially during calibration or in situations where the source has large gamma content.

Figure 5A:
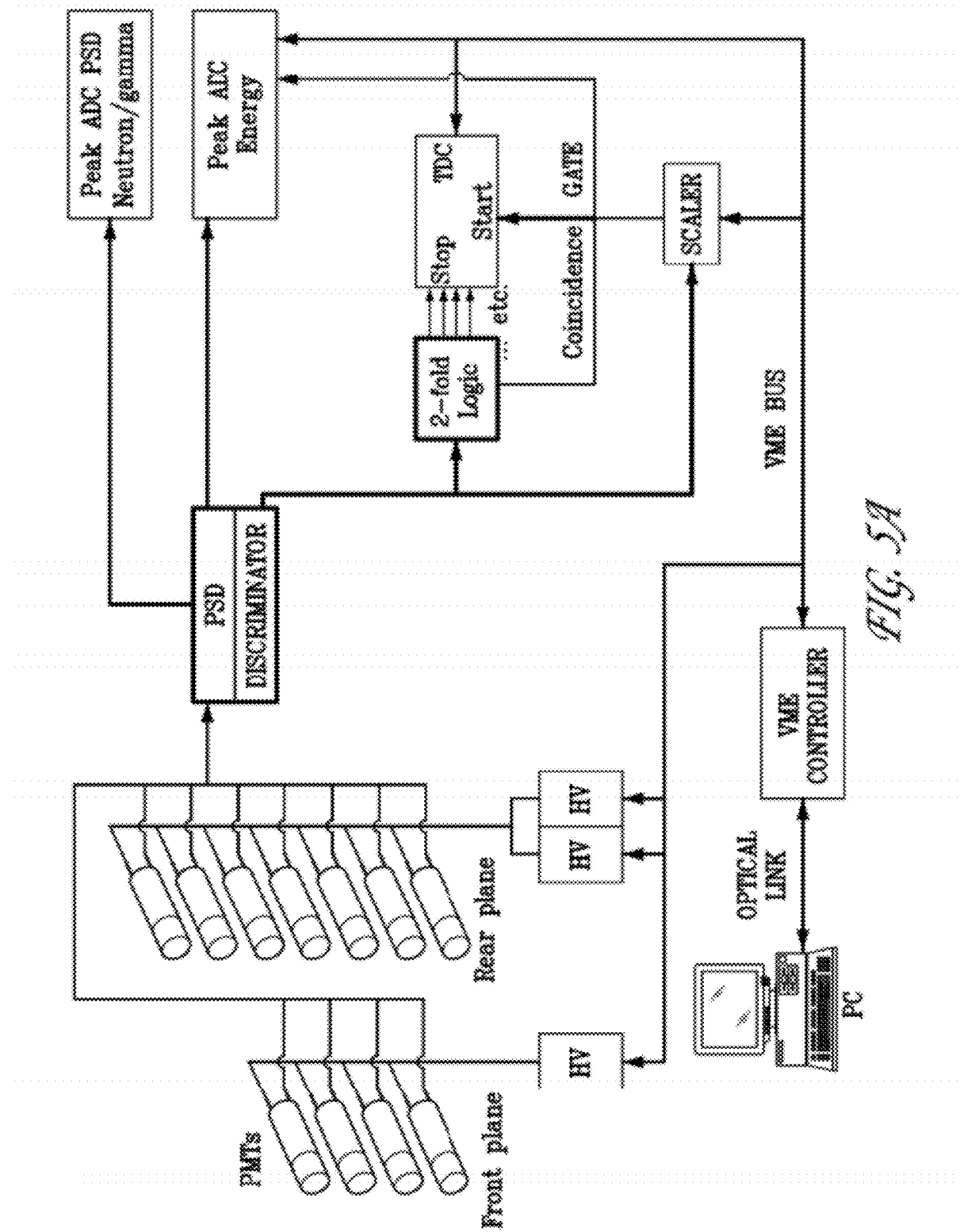
FIG. 5A shows a block-diagram cartoon schematic of a pulse shape discrimination circuit used in the present embodiment.
Figure 5B:
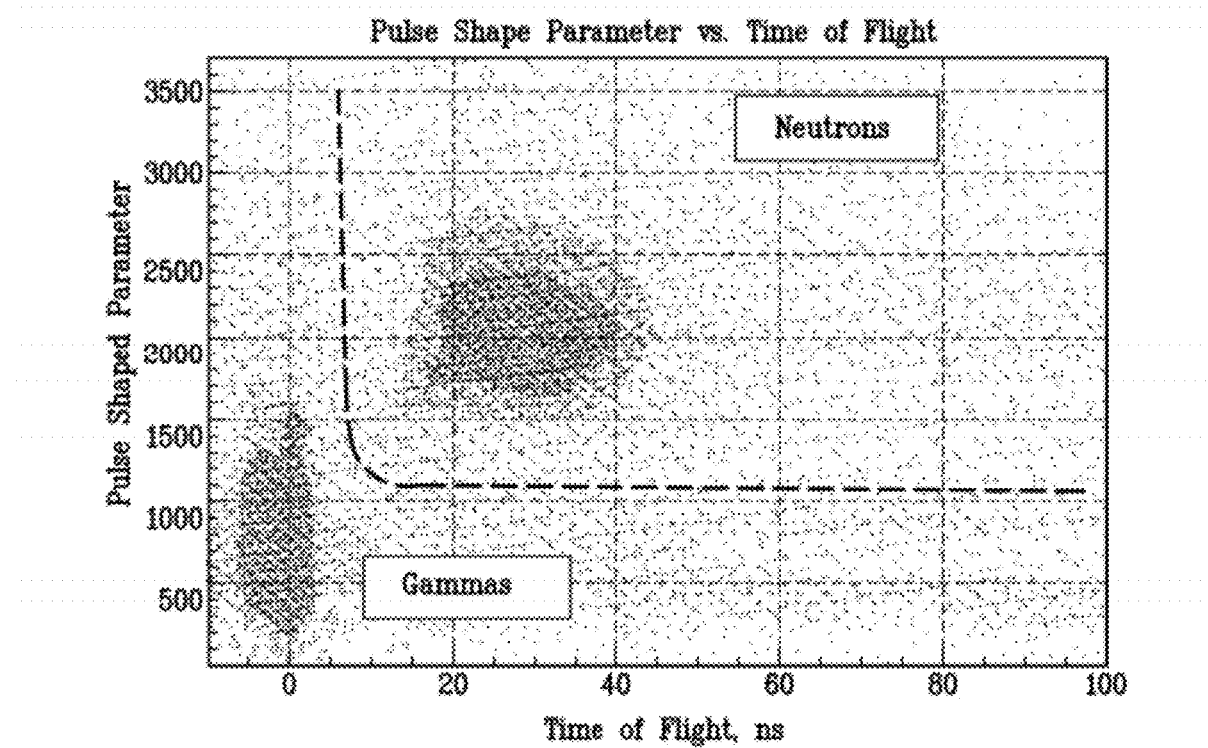
FIG. 5B shows neutron/gamma ray separation achieved through pulse shape discrimination from the liquid scintillator cell used in the present embodiment.

However, since it is known that neutron/gamma-ray separation can be achieved through pulse shape discrimination, or "PSD," our camera design incorporates this feature. We achieve PSD by using the liquid scintillators described above and custom PSD modules obtained from Mesytec GmbH & Co. KG (Putzbrunn, Germany) that quantify the differences in the timing of scintillation light from scattered protons and electrons. This configuration (shown in FIG. 5A) provided us with excellent neutron/gamma discrimination as can be seen in FIG. 5B.

By combining both TOF and PSD, we are able to reduce our gamma contamination to approximately 1 in 25,000 for each detector plane. The band in the gamma region along the bottom of FIG. 5B can be attributed to the accidental gamma-ray coincidences described previously. Without PSD, the total gamma contamination due to this contribution would have been 1 in 5.

Tests of neutron imaging were performed with an Americium-Beryllium (AmBe) source producing neutron having energies up to 8 MeV. We used PSD and TOF to distinguish between neutrons and gamma-rays in each detector array. The proton recoil energy was recorded in the first array with an energy resolution better than 20%. The energy of the scattered neutron ($E_{n_1}$) was computed using TOF and the incoming neutron angle was computed using equation 1.

Figure 6A:
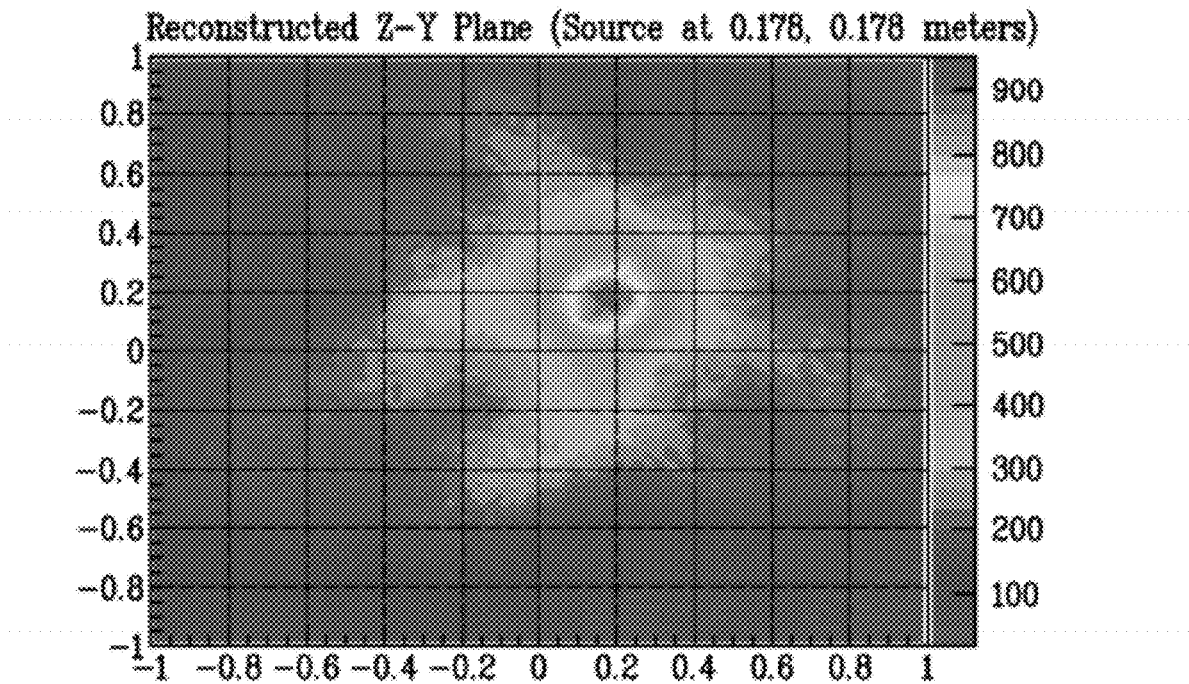
FIG. 6A shows a reconstructed image plane of an AmBe source located at angles of −9° along the horizontal axis and at 23° along the vertical axis relative to the center line of the detector.
Figure 6B:
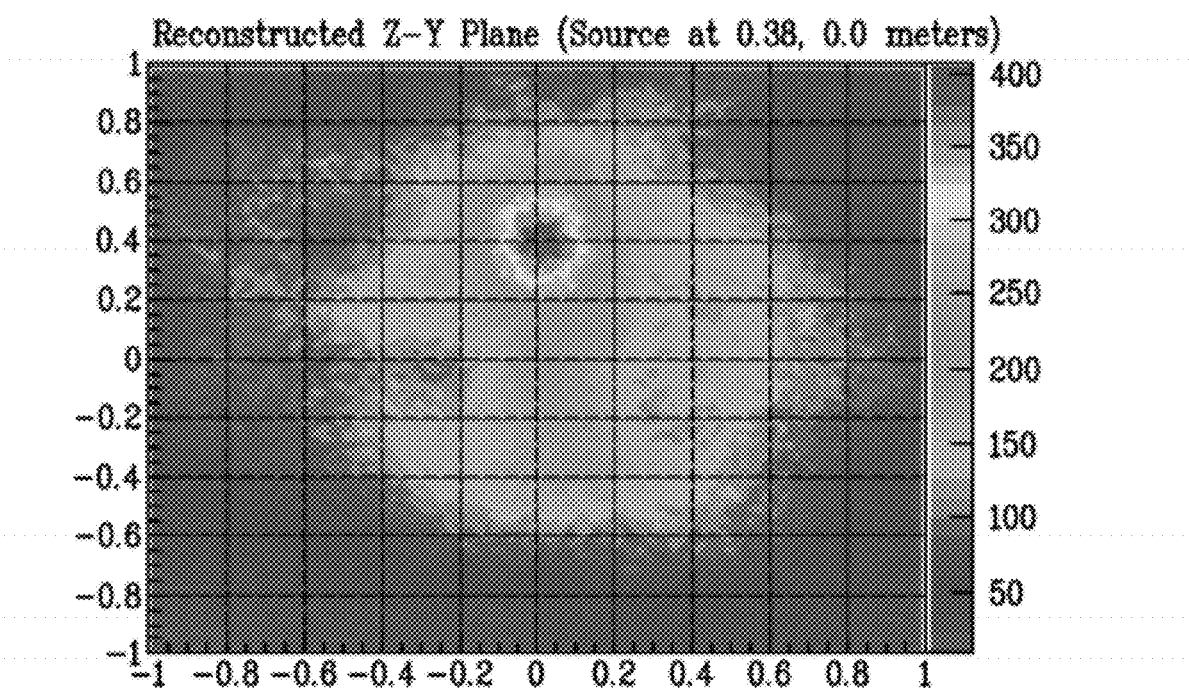
FIG. 6B shows a reconstructed image plane of an AmBe source located at angles of 7°, along the horizontal axis and at 7° along the vertical axis relative to the center line of the detector.

The source image was then reconstructed by back projecting the probability cones defined by each detected neutron. The relative signal strength as a function of incident angle is determined by counting the number of cone intersections within each angular bin. FIGS. 6A and 6B show the performance of the prototype as the source was moved to 2 different positions. The detector clearly detects and identifies neutrons and gammas and reconstructs the position of the AmBe source. The reconstructed image has a mean value within 0.5° of the true source location and a width of ~10° (1 σ).

Figure 7A:
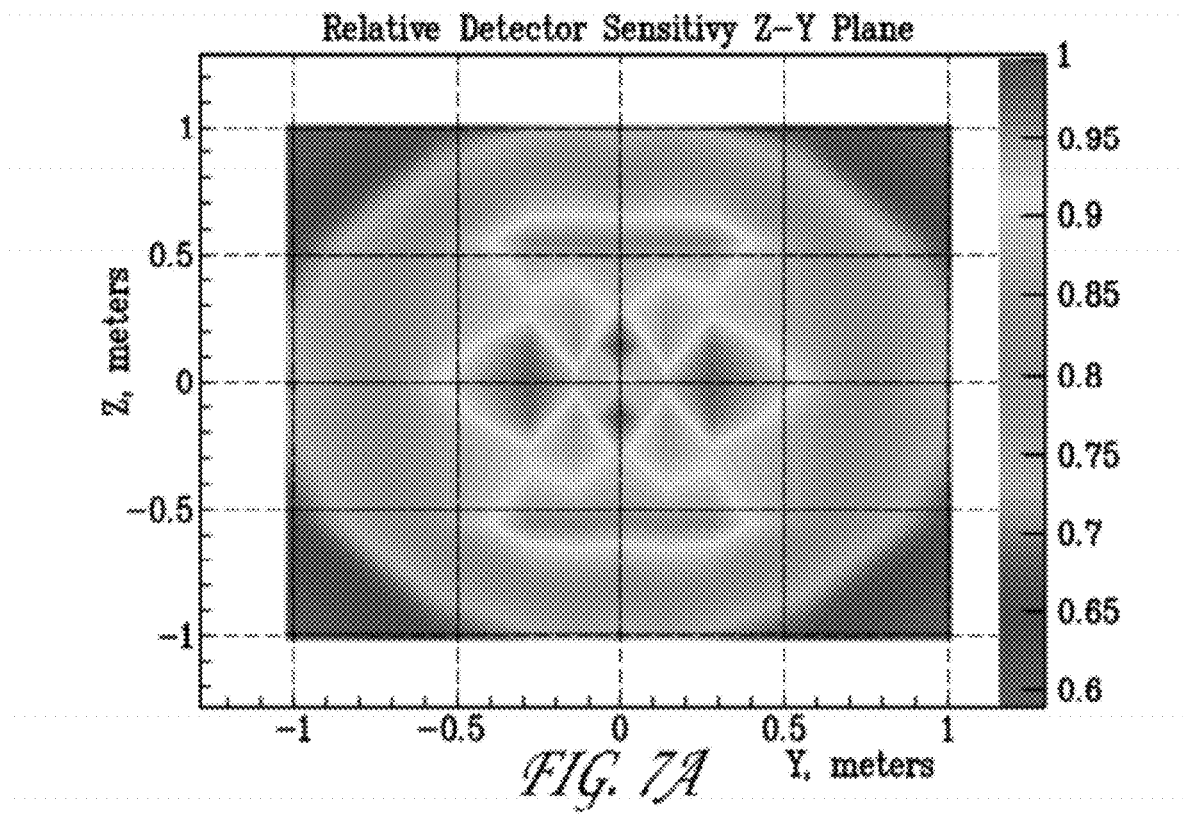
FIG. 7A shows a map of the relative sensitivity of a prototype camera to an AmBe source as a function of incident angle.

The AmBe source was then measured over a full 5 by 5 grid of positions to determine the relative sensitivity of the camera as a function of angle. FIG. 7A is a normalized plot of the number of neutrons detected adjusted by the time of the measurement and the square of the distance to the source. It is clear that the camera remains sensitive out to viewing angles of up to 60° with relatively little variation.

Figure 7B:
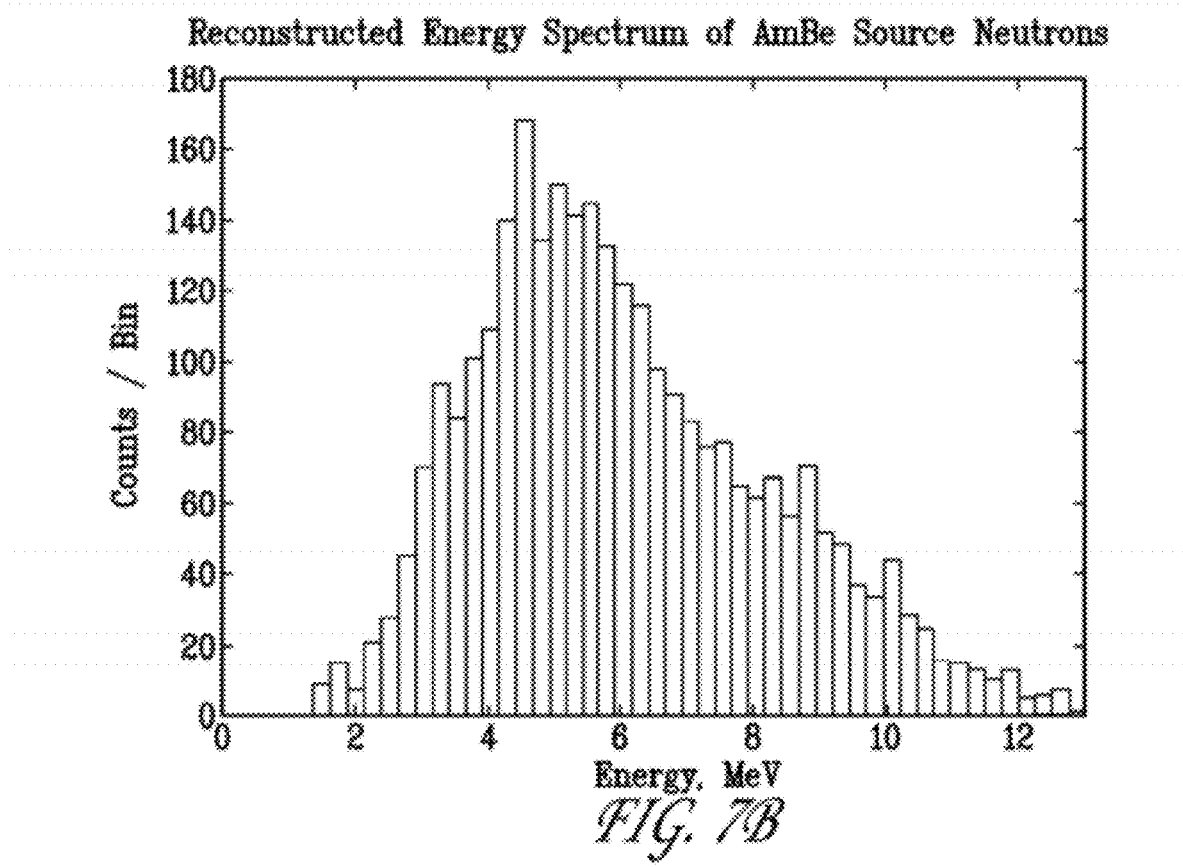
FIG. 7B shows the distribution of incident neutron energies detected from the AmBe source.

As described above, not only is the source location reconstructed, but by taking the sum of $E_p$ and $E_{n_1}$, the energy of the incident neutron, $E_{n_i}$, is determined as well. FIG. 7B is a plot of the distribution of incident neutron energies detected from the AmBe source. With future work, the detector efficiency can be unfolded from this distribution and the source differential flux spectrum will be measured.

We have constructed and tested a prototype neutron scatter camera. The following examples demonstrate its capability to detect and image a neutron source.

Examples

Figure 8A:
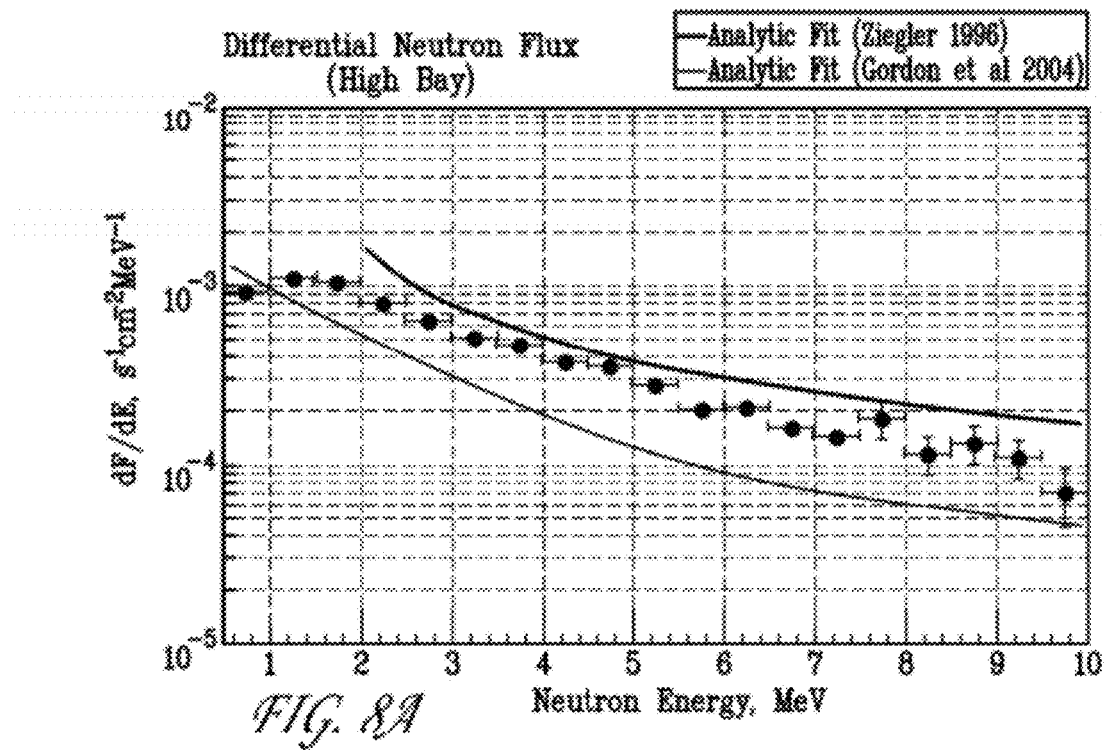
FIG. 8A shows the measured (solid dots) and two predicted (solid lines) differential neutron flux measured over the range of 0.5-10 MeV in Livermore, Calif. at an altitude of 570 ft., and scaled by local pressure to sea level and to a full $4\pi$ measurement.
Figure 8B:
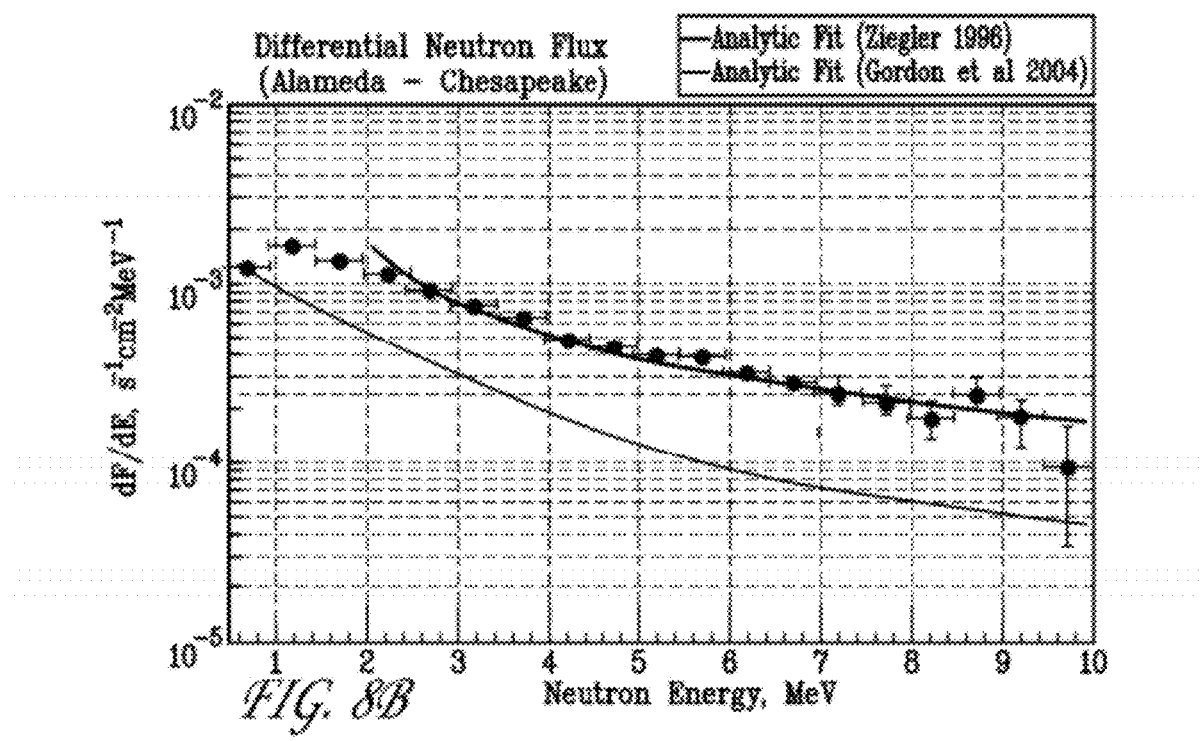
FIG. 8B shows the measured (solid dots) and two predicted (solid lines) differential neutron flux measured over the range of 0.5-10 MeV in Alameda, Calif. at sea level, and scaled by local pressure to sea level and to a full $4\pi$ measurement.
Figure 8C:
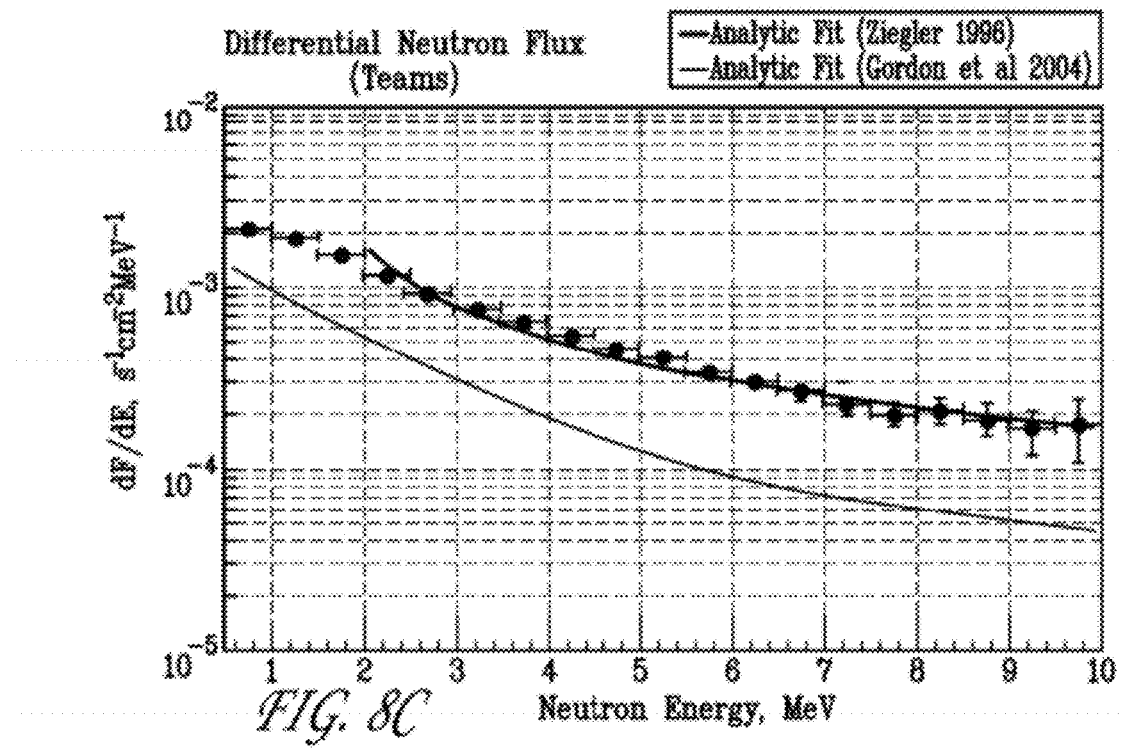
FIG. 8C shows the measured (solid dots) and two predicted (solid lines) differential neutron flux measured over the range of 0.5-10 MeV Albuquerque, N. Mex. at an altitude of 4300 ft., and scaled by local pressure to sea level and to a full $4\pi$ measurement.
Figure 8D:
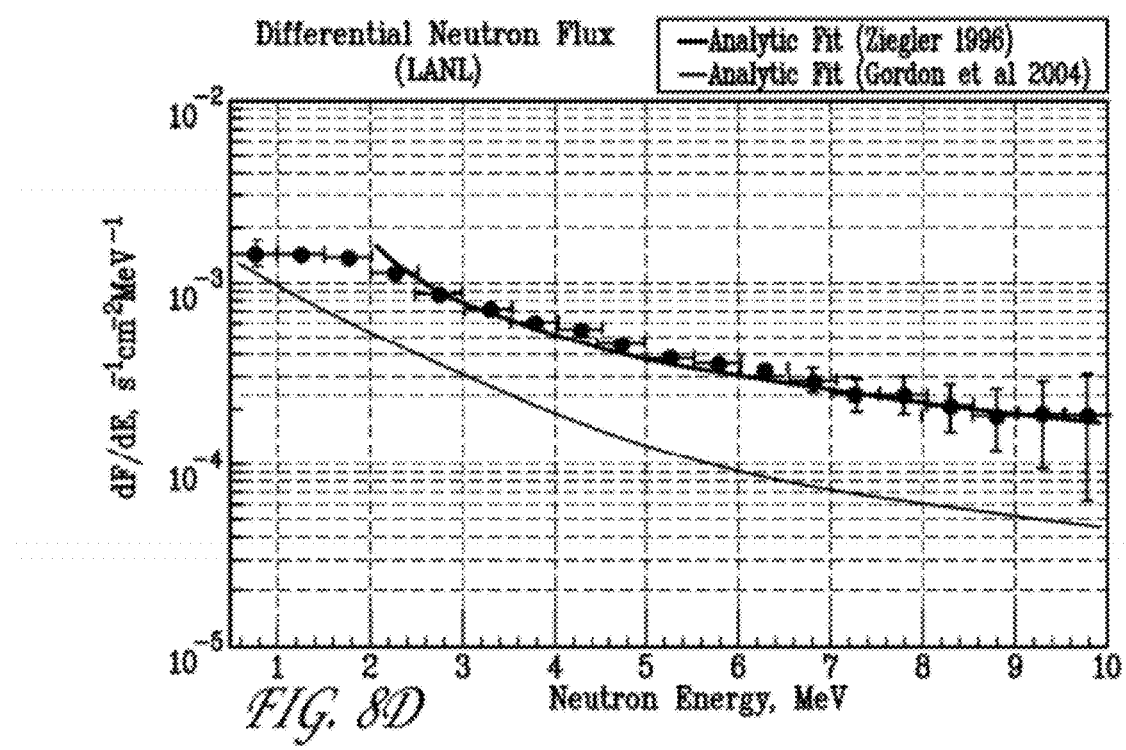
FIG. 8D shows the measured (solid dots) and two predicted (solid lines) differential neutron flux measured over the range of 0.5-10 MeV at Fenton Hill, N. Mex. at an altitude of 8630 ft, and scaled by local pressure to sea level and to a full $4\pi$ measurement.
Figure 9:
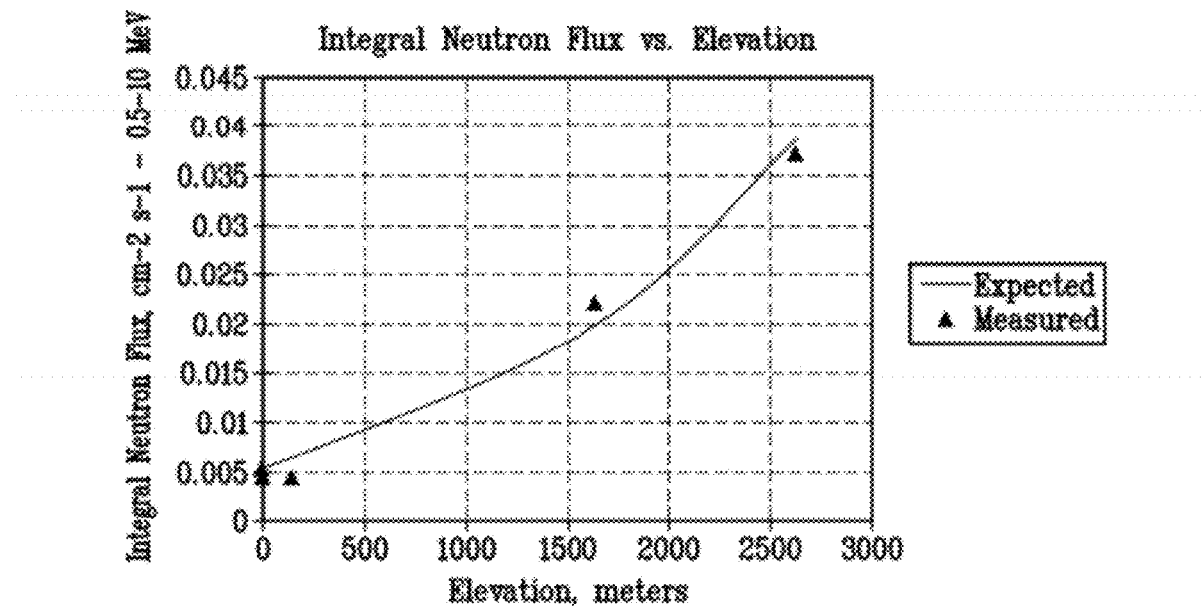
FIG. 9 shows the measured (solid triangle) and expected (solid line) integral cosmic ray neutron flux from 0.5-10. MeV as a function of altitude.

Neutron Background Measurements:

We used a version of the neutron scatter camera with four elements in the front array and seven in the rear array to perform additional background measurements at fission energies from 1 to 10 MeV. The camera and readout electronics were ruggedized and placed in a 40 foot land/sea shipping container. The container was transported to various sites where background measurements were conducted. The sites selected were Alameda Point, Calif. at sea level, Livermore, Calif. at an altitude of 570 ft, Albuquerque, N. Mex. at 5300 ft and Fenton Hill, N. Mex. at 8630 ft. At each location we measured the differential cosmic ray neutron flux as well as the neutron angular distribution from 1 MeV to 10 MeV. The differential flux measurements have been corrected to sea level and are shown in FIGS. 8A, 8B, and 8C. The integral flux is shown for each measurement and the variation in the integral neutron flux from 1 MeV-10 MeV with altitude is shown in FIG. 9.

Figure 10:
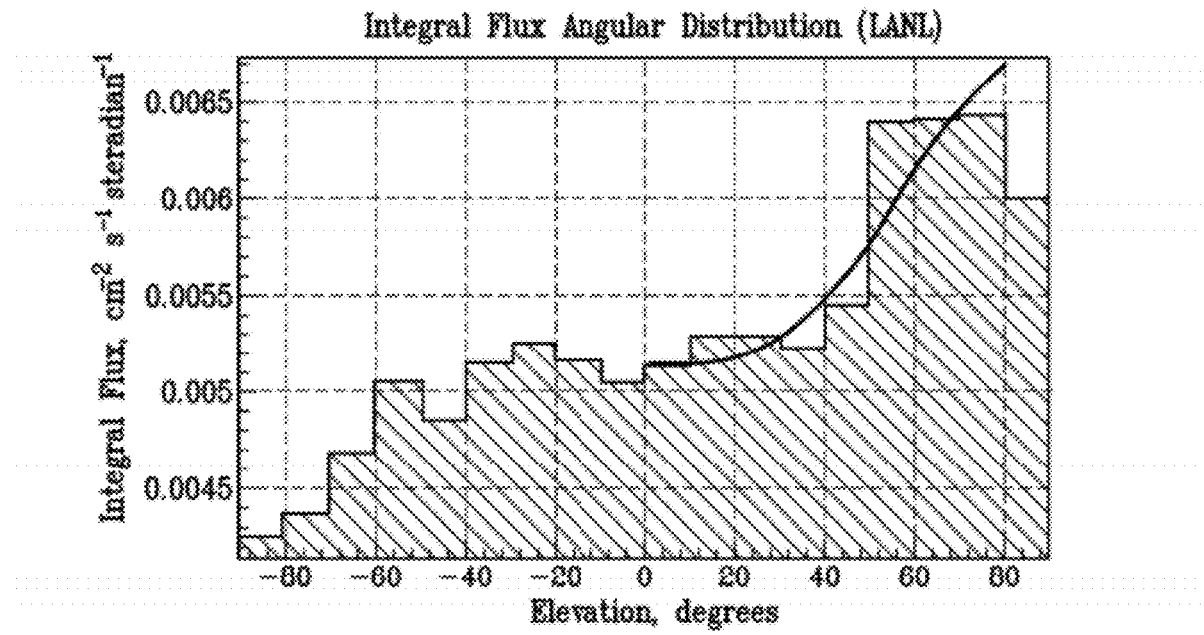
FIG. 10 shows the angular distribution of cosmic neutrons (between 1 MeV and 10 MeV) at Fenton Hill, N. Mex., illustrating that the distribution is non-isotropic and is peaked at the zenith. The overlaying line shows that distribution is approximated by a $\sin^n \theta$ function.

As expected, the neutron flux increases by a factor of 9 from sea level to 8630 ft. Our differential flux data are in good agreement with an analytic function proposed by Ziegler for neutrons with energies from 10 MeV to $10^4$ MeV ("Terrestrial cosmic rays," *IBM Journal of Research and Development*, 1996, v. 40(1): pp. 19-39). We have extrapolated Ziegler's function below 10 MeV to overlay our data. The cosmic ray neutron angular distribution was measured for the first time from 1 MeV-10 MeV. It peaks at the zenith and follows a distribution of the form as $\sin^n \theta$ shown in FIG. 10.

Figure 11:
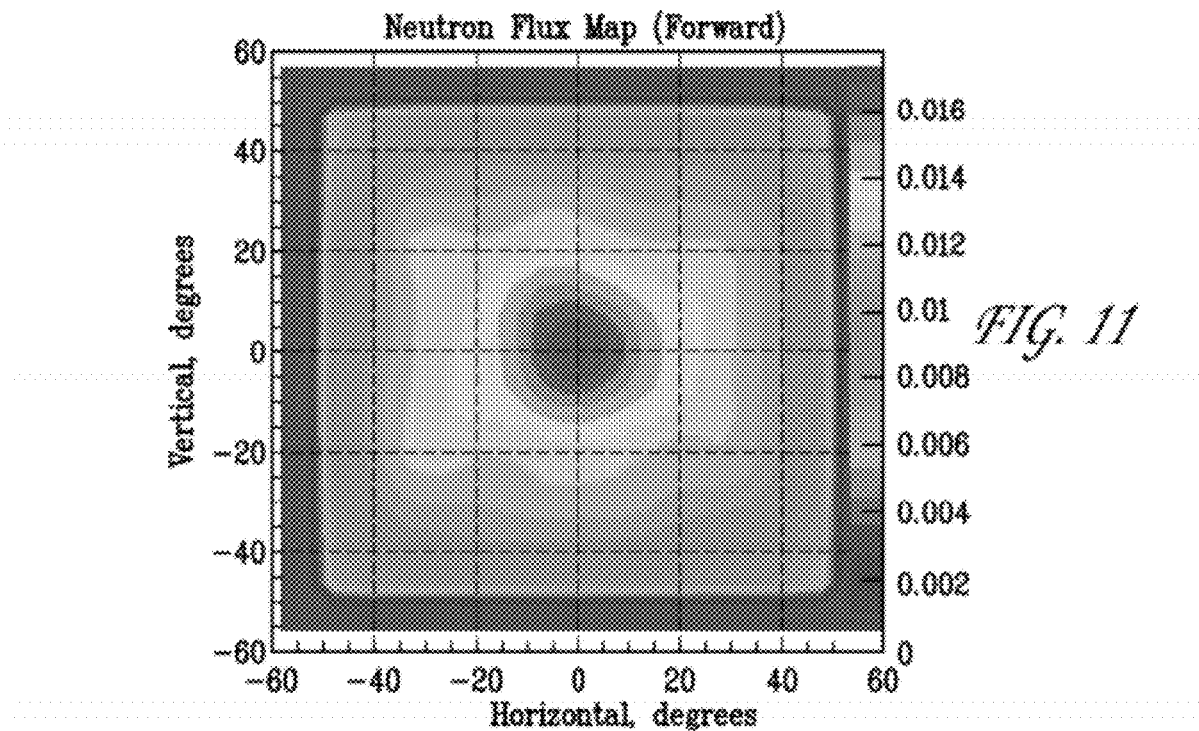
FIG. 11 shows the image obtained using the camera of the present embodiment of a $^{252}$Cf source placed inside the cargo hold of a large ocean tanker. The vertical scale of the image is in units of neutrons/second/cm$^2$/steradian (1.0-10 MeV).
Figure 12:
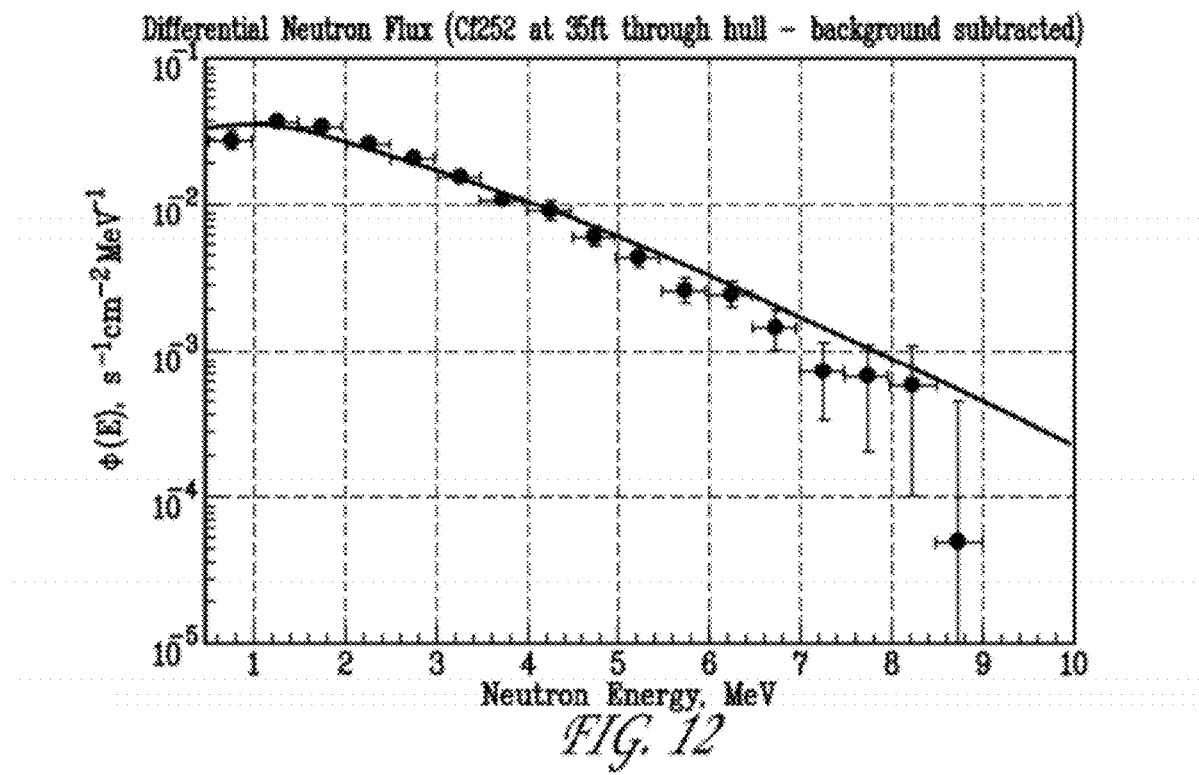
FIG. 12 shows the neutron energy distribution (the integral flux quoted is in the energy range 0.5-10 MeV over the entire FOV) measured for a $^{252}$Cf neutron source (solid dots) inside an ocean tanker and a Watt spectrum (solid line) scaled to overlay the data.

Detecting a Neutron Source Hidden in a Tanker:

To demonstrate the neutron scatter camera's capability, a Californium ($^{252}$Cf) neutron source was placed in the cargo tank of a large ocean tanker at Pier 3, Alameda Point, Calif. The detector was positioned alongside the tanker in a 40 foot land/sea container on the dock. The source was detected within minutes through the steel hull of the tanker and the container. The source location was pinpointed using imaging and the energy spectrum measured indicated the presence of a fission neutron source as shown in FIGS. 11 and 12. The measured integral flux from 0.5 MeV-10 MeV over the entire FOV of the detector was greater than ~3× the cosmic background while the signal to background in the brightest bin was over 30. The significance of this detection was 16 sigma/$hr^{-1/2}$. This illustrates the power of imaging in such applications. The shape of the measured spectrum agrees with a Watt fission spectrum which is "softer" than the cosmic background spectrum in the range 4 MeV-10 MeV.

Figure 13:
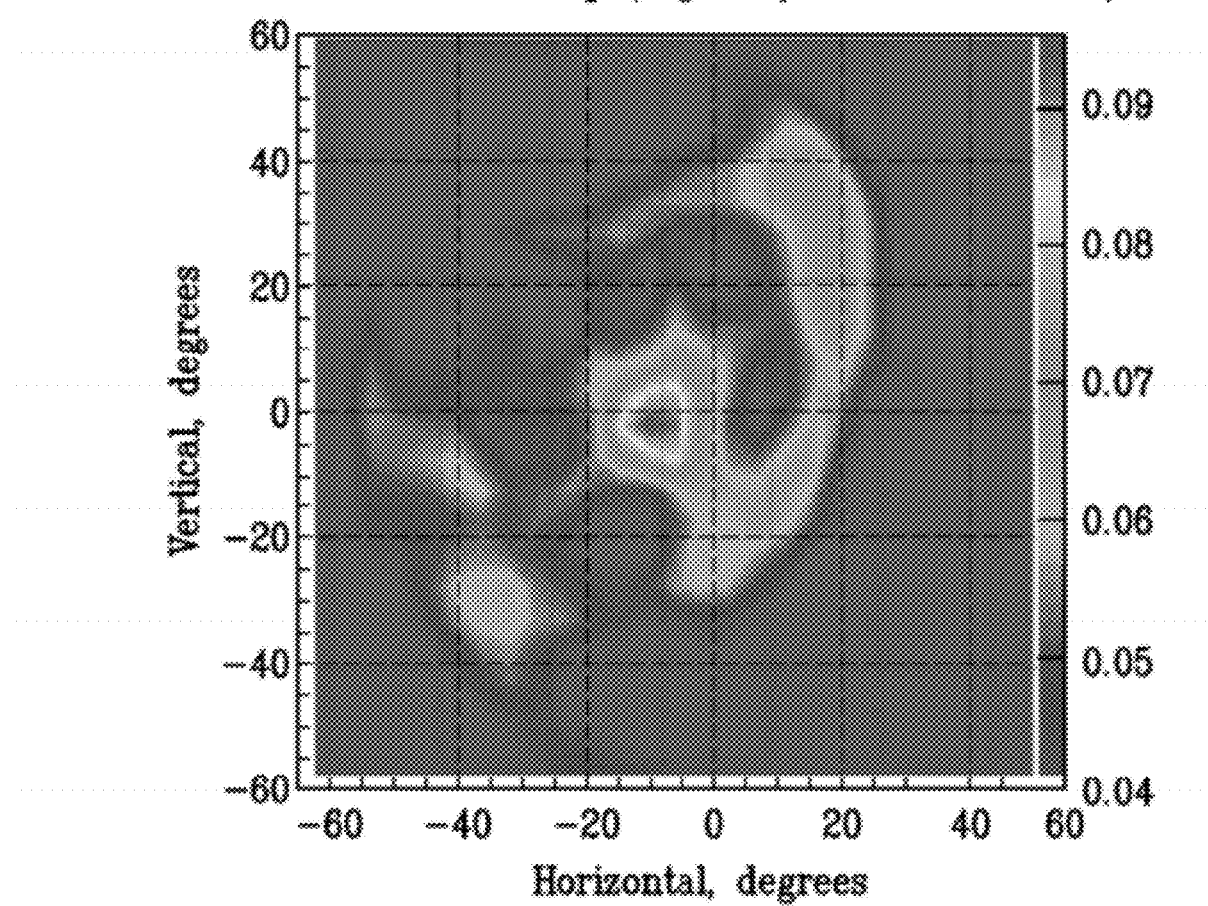
FIG. 13 shows an image of the $^{252}$Cf source at 100 ft. from the camera of the present embodiment.

Detecting a Neutron Source at a Distance:

Lastly, we next demonstrated remote detection capabilities by placing the $^{252}$Cf source at a distance of 100 ft (30.5 m) from the detector in our High Bay facility located in Livermore, Calif. The source was successfully detected and imaged in approximately one hour as shown in FIG. 13.

We, therefore, have successfully deployed and demonstrated a neutron scatter camera and measured the neutron background variation with altitude, energy and zenith angle. The neutron background in the fission energy region from 1 MeV to 10 MeV has been precisely measured and is relatively low. A $^{252}$Cf source hidden in a tanker was detected within minutes. Hence we conclude fast neutron imaging can be a useful tool for the detection of smuggled special nuclear material.

Scatter Camera with Improved Neutron Detection Capability:

The current neutron scatter camera and fast neutron imager designs to date use TOF to measure the scattered neutron energy. We conducted a study with the 9+9 cell neutron scatter camera to use energy measured by the scintillator cells in the rear plane instead of TOF. If the rear cell energy is used instead of TOF (the two planes are ~46 cm apart when using TOF to allow for good TOF measurements), we can move the two detector planes closer together, for example by about 13 cm, and significantly increase the solid angle available for capturing scattered neutrons into the rear plane. This modification also increases the overall neutron detection efficiency of the instrument by about 3-fold. As before, particle identification (gamma rejection) is achieved via pulse shape discrimination. Our current camera demonstrated neutron/gamma rejection with PSD of about $10^4$ (the ratio of gamma rays rejected to neutrons accepted by the detector) for each plane. Because TOF allows for neutron/gamma ray rejection of only about 10, it is not essential to use TOF for gamma ray rejection. Therefore TOF will only be used for identifying forward and backward events, which works at a plane separation distance of about 13 cm. The tradeoff to using this approach is accepting larger errors in measuring the energy, $E_{nn}$ of scattered neutrons. This arises because using TOF to measure scattered neutron energy has better precision than energy deposited in liquid scintillator. The resulting angular resolution and incoming neutron energy will be worse. However, such a design is acceptable for many practical applications: cases where only modest directionality is sufficient to identify a threat, but increased detection efficiency is of paramount importance in order to detect that threat.

Figure 14:
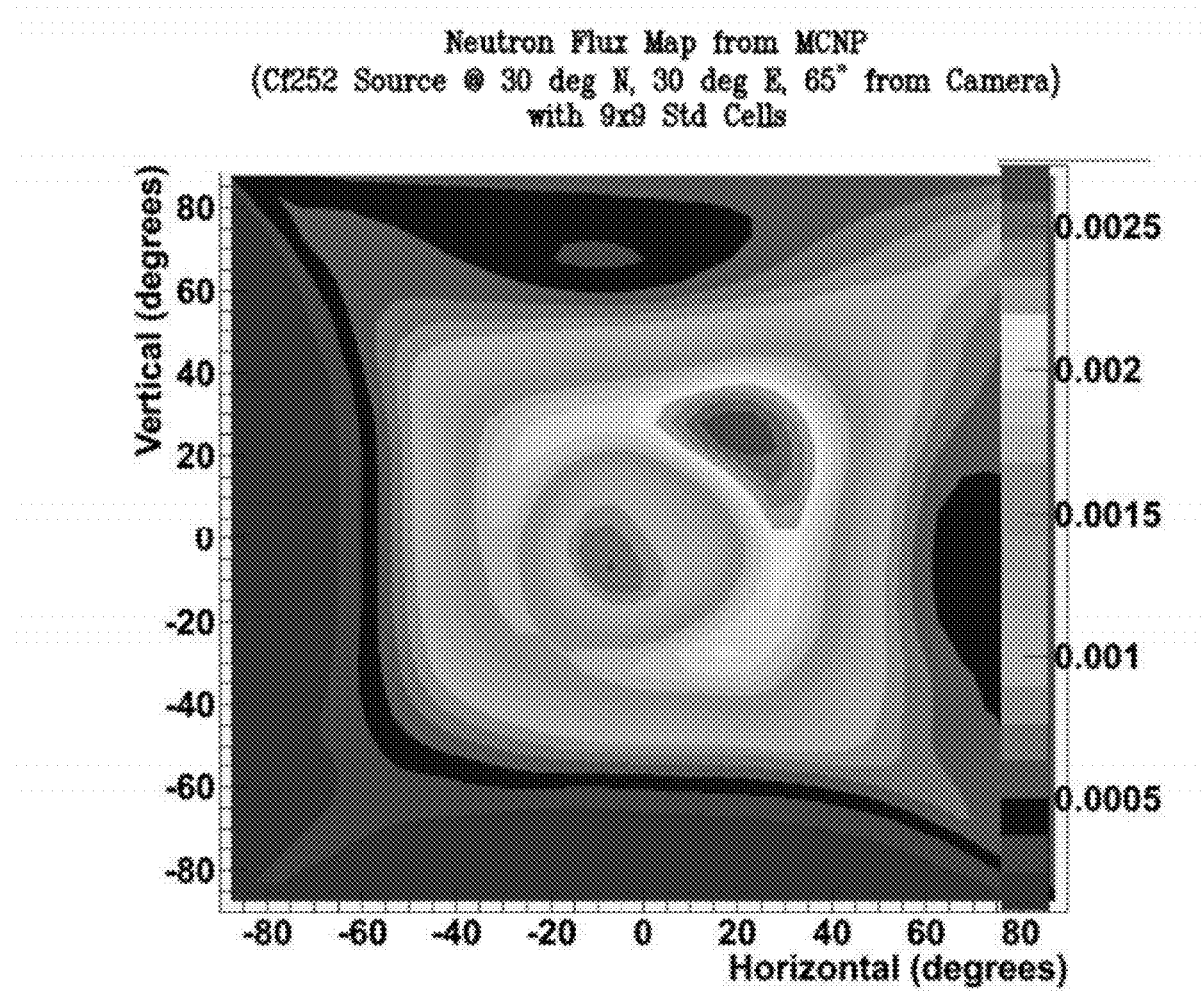
FIG. 14 shows an image of the $^{252}$Cf source at 100 ft. from the camera of the improved neutron camera.

Initial computer simulations were conducted using the MCNP-PoliMi simulation code (MCNP-PoliMi ver. 1.0 user's manual, CESNEF-021125, Library of Nuclear Engineering Department, Politecnico di Milano, November 2002) show that the above technique could result in a ~3× increase in efficiency with a reduction in directional fidelity (see FIG. 14). The MCNP-PoliMi code has been developed from the standard MCNP code to simulate each neutron-nucleus interaction as closely as possible. In particular, neutron interaction and photon production are correlated and corrected neutron and photon fission multiplicities have been implemented. The code output consists in relevant information about each collision; for example, the type of collision, the collision target, the energy deposited, and the position of the interaction. Simulation of a $^{252}$Cf source placed at (+30, +30 degrees) from the detector. In this design study, detector planes are placed 13 cm apart. The energy of the scattered neutron is obtained using energy deposited in the rear cells instead of TOF. The fidelity is reduced to ~15 degrees (1 sigma).

Our camera is generally illustrated with reference to FIG. 4B. The detector described above are grouped together into two arrays 140 and 150 of detector cells and mounted onto one of two separate structural "frames" 120 and 130 held within cage 160. Moreover, the detectors associated with each frame are further disposed about a virtual center axis A running the length of cage 160 and normal to each of two virtual planes P comprising frames 120 and 130 such that each frame was spaced apart from the other at a pre-defined distance by attaching each to several of the crossing members 112. "Outward" looking faces of each detector were mounted in the same direction, although this need not be the case.

However, as illustrated in FIG. 15, camera 100 also may be constructed with a means for moving the two arrays 140 and 150 of detectors assemblies relative to each other such that the distance between them can be varied. This is desirable because the closer together arrays 140 and 150 are positioned to each other, the greater the angular space occupied by the rear array of detector cells for capturing neutrons scattering out of the front array of detector cells and therefore the greater the sensitivity of the camera 100 for detecting neutrons. As noted above, the error in the TOF measurement increases because of the uncertainty caused by the depth of the cells with respect to the distance between scatters increases. However, we have shown through simulation experiments that we can obtain up to a 3-fold improvement in detection efficiency by sacrificing some degree of angular resolution and this decrease in angular resolution may be acceptable for many applications.

In those cases where greater sensitivity is required, camera 100 may be reconfigured by separating the arrays 140 and 150 of detectors assemblies from outer cage 160 such that frames 120 and 130 are disconnected from surrounding struts and crossing members 110 and 112, attaching a linear bearing comprising a runner block 162 (such as are available from the Pacific Bearing Company, Roscoe, Ill.) to each corner of frames 120 and 130; and a rail 164 (also available Pacific Bearing Company). Rails 164 are themselves attached along the upper and lower horizontal struts 110 of cage 160 and each of the runner blocks 162 engages an adjacent proximal rail 164. This configuration, therefore, provides a means for moving each of the arrays 140 and 150 of detectors laterally within cage 160 over a distance limited only by the length of rails 164 and by the interference of the detectors and electrical connections with struts and crossing members at either end of cage 160. A locking assembly (not shown) such as a set screw, a thumb screw, a toggle clamp, or a cam-lock is also included at two or more opposite corners of each frame for fixing the position of that frame in place once each has been repositioned. Other repositioning means are also possible, including but not limited to rack and pinion gears, radial bearings, lubricated friction slides, and linear screw drives.

Finally, it is possible to use a drive assembly (not shown) comprising an electric motor and a set of worm gears attached to one or more of the four corners of each frame 120 and 130, wherein the two frames may be moved relative to each other. The distance between detector assemblies, therefore, may be dynamically changed using such a gear- or motor-drive and permit toggling between the two modes of neutron detection.

Figures 16A, 16B:
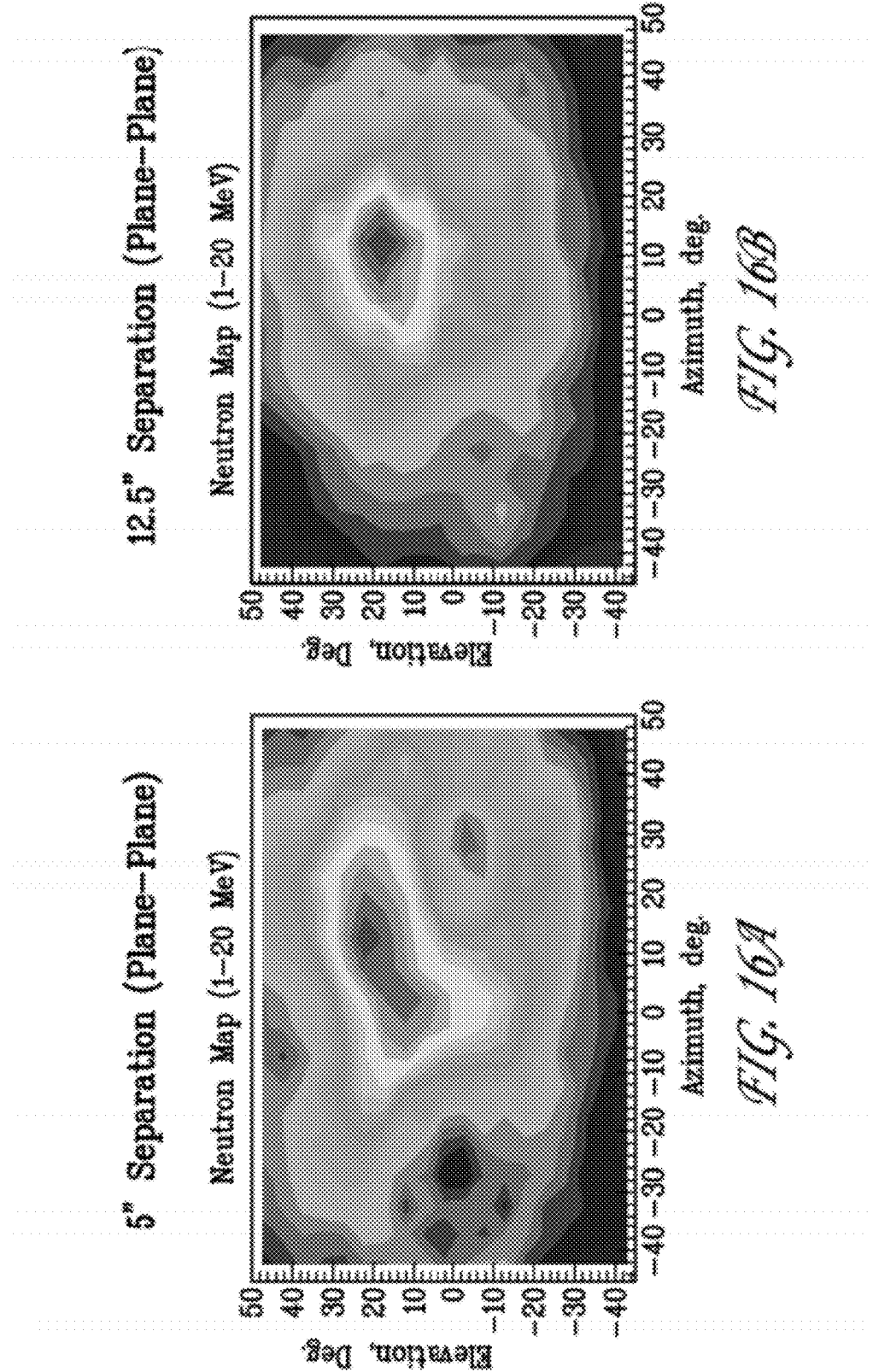
FIGS. 16A and 16B show the image of neutrons from a $^{252}$Cf source having energies between 1 and 20 MeV detected by the improved neutron camera where the detector arrays are separated by a distance of 5 inches and 12.5 inches, respectively, and mapped over elevation angles of ±40° and azimuth angles between −40° and +50°.

The improved camera was tested with a neutron camera of the present design front/rear planes of detectors comprising 16 cells each separated (plane-to-plane) at a distance of 12.5 and at a distance of 5 inches. Neutrons from the $^{252}$Cf source having energies between 1 and 20 MeV were "mapped" over elevation angles between +50° and −40° and azimuth angles between −40° and +50°. These results are shown graphically in FIGS. 16A and 16B. In the case of the detector planes position with a separation distance of 5 inches, 2477 neutrons were detected during a period of 228 seconds (3.8 minutes) yielding a detector rate of 10.9 neutrons/second. In the case of the detector planes position with a separation distance of 12.5 inches, 2526 neutrons were detected during a period of 399 seconds (6.65 minutes) yielding a detector rate of 6.34 neutrons/second. The measured relative efficiency improvement in detecting neutrons is therefore 172%.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

Finally, to the extent necessary to understand or complete the disclosure of the present invention, all publications, patents, and patent applications mentioned herein are expressly incorporated by reference therein to the same extent as though each were individually so incorporated.

We claim:

1. An improved neutron scatter camera, comprising:
   a liquid scintillator cell having a front and a rear face, and a photomultiplier tube (PMT) coupled to the rear face of the liquid scintillator cell to provide a detector assembly;
   a first plurality of detector assemblies disposed in a first group and mounted onto a first plurality of struts, the first plurality of struts interconnected to form a first rigid frame;
   a second plurality of detector assemblies disposed in a second group and mounted onto a second plurality of struts, the second plurality of struts interconnected to form a second rigid frame;
   a pulse discrimination module in electrical communication with each of the first and second plurality of detector assemblies;
   a rigid cage having a length, width and height, wherein the first and second rigid frames are disposed with the rigid cage and held in parallel alignment with respect to each other and with the plane of the rigid cage height and width; and
   a means for moving the first and second rigid frames relative to each other within the rigid cage.

2. The improved neutron scatter camera of claim 1, wherein the number of detector assemblies disposed in the first group is the same as the number of detector assemblies disposed in the second group.

3. The improved neutron scatter camera of claim 1, wherein the number of detector assemblies disposed in the first group is different than the number of detector assemblies disposed in the second group.

4. The improved neutron scatter camera of claim 1, wherein the first group of detector assemblies comprises a first uniform array and wherein the second group of detector assemblies comprises a second uniform array.

5. The improved neutron scatter camera of claim 4, wherein the first and second uniform arrays are disposed about respective first and second virtual axes normal to the respective first and second rigid frames, and wherein the first and second virtual axes are disposed in a coincident collinear relationship to each other.

6. The improved neutron scatter camera of claim 1, wherein the front face of each of the liquid scintillator cells comprising the first group of detector assemblies is oriented to face the front face of each of the liquid scintillator cells comprising the second group of detector assemblies.

7. The improved neutron scatter camera of claim 1, wherein the separation distance is selected to maximize coverage of the second group of detector assemblies to neutrons scattered by the first group of detector assemblies.

8. The improved neutron scatter camera of claim 1, wherein the first and second rigid frames are rectilinear.

9. The improved neutron scatter camera of claim 8, wherein the first and second rigid frames are square.

10. The improved neutron scatter camera of claim 1, wherein the rigid cage comprises:
   a rigid stand;
   a pivot assembly mounted to the rigid cage at a midpoint on two opposite faces of the rigid cage between the first and second rigid frames; and
   a pair of pivot arms connecting the pivot assembly to the rigid stand, wherein the pivot arms each comprise a length greater than half the length of the rigid cage thereby allowing the rigid cage to rotate through $2\pi$ radians.

11. The improved neutron scatter camera of claim 10, wherein the rigid cage is orthorhombic.

12. The improved neutron scatter camera of claim 1, wherein the means for moving the first and second rigid frames relative to each other within the rigid cage comprises one or more of a plurality of linear bearings, rack and pinion gear assemblies, threaded screw assemblies, rod and radial bearing assemblies, and lubricated friction slides.

13. The improved neutron scatter camera of claim 1, wherein the means for moving the first and second rigid frames further includes an electric motor drive.

* * * * *